July 10, 1951  B. G. OLVING  2,560,388
AUTOMATIC ELECTRIC TOASTER
Filed Jan. 6, 1945  3 Sheets-Sheet 2
Fig-4
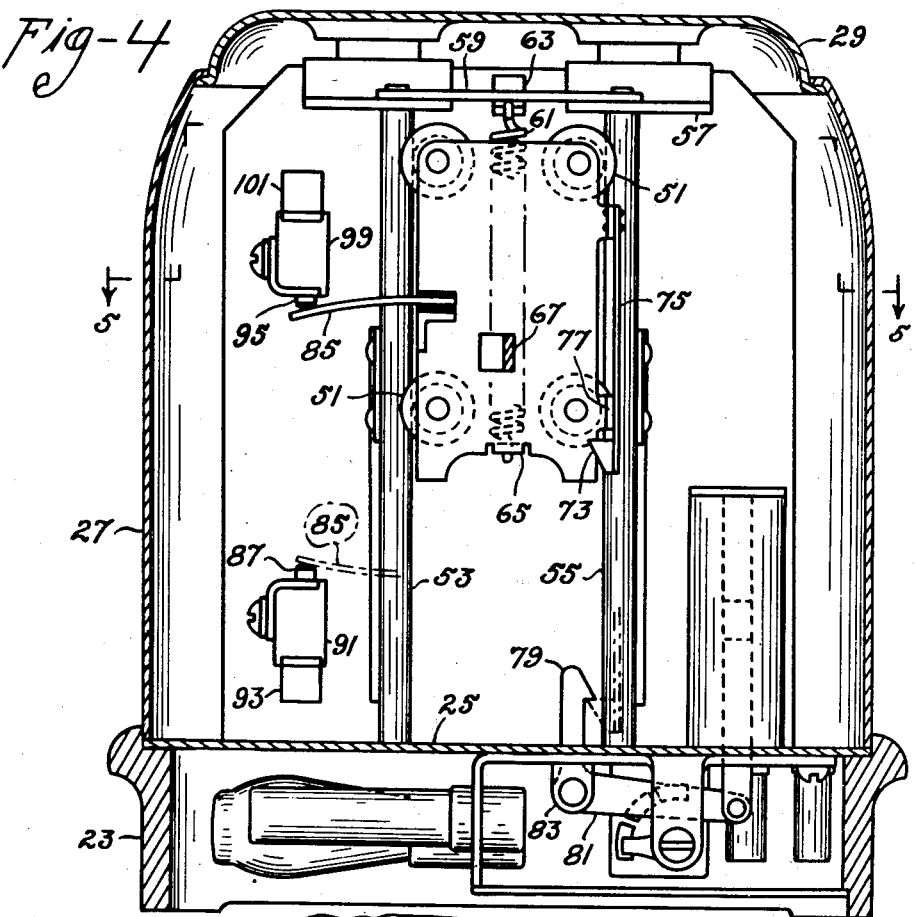
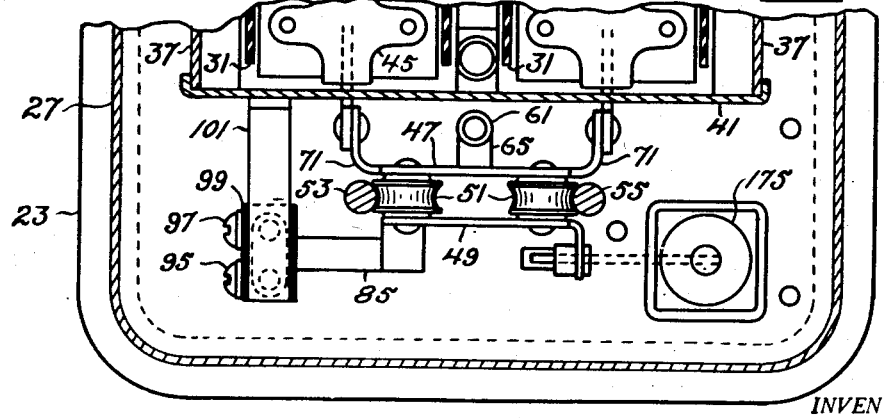
Fig-5
INVENTOR.
BROR G. OLVING
BY
N. M. Bichel
Atty July 10, 1951  B. G. OLVING  2,560,388
AUTOMATIC ELECTRIC TOASTER Filed Jan. 6, 1945  3 Sheets-Sheet 3

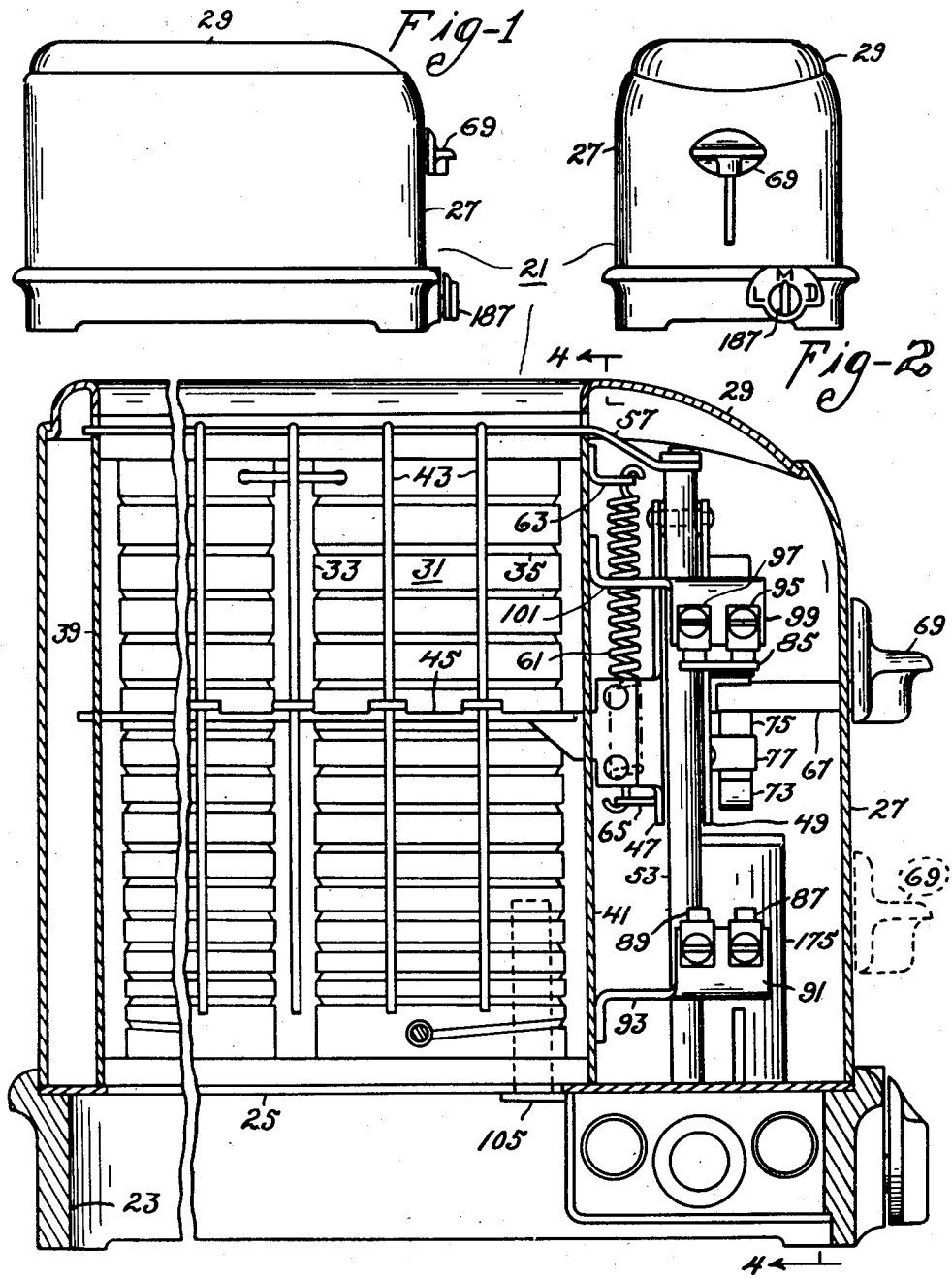

INVENTOR.
BROR G. OLVING
BY H. M. Bielges
Atty

Patented July 10, 1951

2,560,388

UNITED STATES PATENT OFFICE 2,560,388

AUTOMATIC ELECTRIC TOASTER

Bror G. Olving, Elgin, Ill., assignor to McGraw Electric Company, Elgin, Ill., a corporation of Delaware Application January 6, 1945, Serial No. 571,629

4 Claims. (Cl. 99—328)

My invention relates to automatic electric toasters and particularly to means for timing the duration of a toasting operation.

An object of my invention is to provide a timing means and an electric circuit therefor, which are dependable and will stand up for long periods of service.

Another object of my invention is to provide a timing means, the performance of which depends on the inherent electrical characteristics of its component parts, and the operation of which is not dependent on or controlled by energy supplied from mechanical or thermal storage devices.

Another object of my invention is to provide an electric timing means and an electric circuit therefor, including an electron tube to obtain the above-mentioned performance.

Another object of my invention is to provide a timing circuit, including an electron tube and means for varying the duration of a toasting operation to compensate for temperature changes of the toaster structure, different circuit voltages, and to permit of obtaining different degrees of toasting desired by the user.

Other objects of my invention will either be apparent from a description of several different circuits embodying my invention or will be pointed out in the course of such description and set forth more particularly in the appended claims.

In the drawings,

Figure 1 is a view, in side elevation, of a toaster having operatively associated therewith a system embodying my invention, Fig. 2 is a front view of the toaster, Figs. 1 and 2 being on a reduced scale, Fig. 3 is a longitudinal, vertical, sectional view through a toaster, having associated therewith a circuit embodying my invention, Fig. 4 is a vertical, lateral, sectional view therethrough taken on the line 4—4 of Fig. 3, Fig. 5 is a fragmentary, horizontal, sectional view taken on the line 5—5 of Fig. 4.

Figures 6, 7:
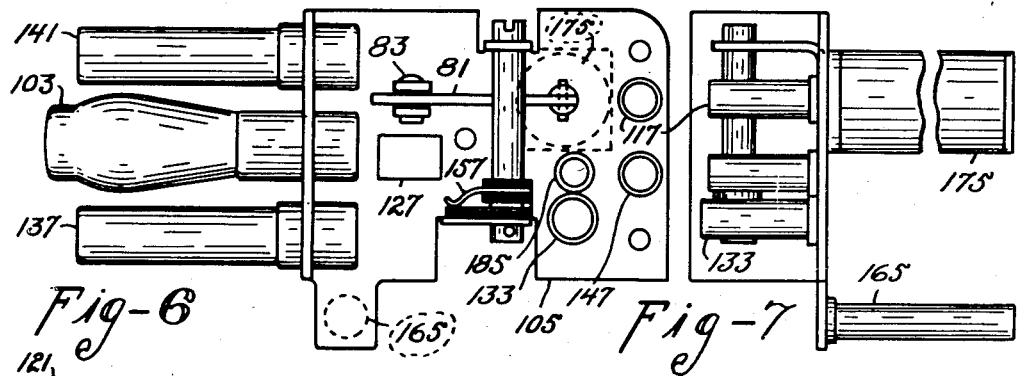
Fig. 6 is a bottom view of a timing element.
Fig. 7 is an end view of the parts shown in Fig. 6.

Referring first to Figs. 1 to 5 inclusive, I have there shown a standard two-slice automatic electric toaster designated generally by the numeral 21, and comprising a bottom frame member 23, which may be made of pressed composite material and which supports at its upper end a bottom plate 25 and an outer casing 27 thereon. The casing is provided with an interfitting cover member 29, and I have elected to show a two-slice toaster such as is now on the market.

I provide two pairs of vertical, planar heating elements, designated generally by the numeral 31, each of said heating elements comprising one or more sheets 33 of thin electric-insulating material, such as mica, on which is wound a strip 35 of a suitable resistance material. Each pair 31 of the planar heating elements is positioned in a toasting chamber, of which one of said heating elements constitutes one side, while a baffle plate 37 constitutes the outer side thereof. An intermediate rear wall 39 and a front intermediate wall 41 are also provided, and these walls and baffle plates are supported and held in proper operative positions by means now well known in the art. I provide also a plurality of vertically-extending guard and guide wires 43, which are also supported in any manner now well known in the art and serve to prevent lateral movement of a slice of bread being toasted in a toasting chamber and engagement thereof with the resistor 35.

I provide a pair of bread carriers 45, one in each of the toasting chambers, the rear end portions of which extend through vertical slots in the rear intermediate wall 39. The front end portions of carriers 45 are secured to a rear carriage plate 47, which is of substantially rectangular shape. I provide further a front carriage plate 49, which may be of substantially the same size as is the rear carriage plate, and position therebetween four grooved rollers 51 on short shafts, one at each of the four corners of the front end of the rear carriage plate. The grooved rollers 51 are adapted to engage against the inner surfaces of two vertical standards or rods 53 and 55, the lower ends of which are secured in the bottom plate 25, while the upper ends are secured in horizontally-extending top frame plates 57. The front end portions of the top frame plates 57 are secured together by a cross bar 59. A tension coil spring 61 has its upper end secured to a bracket 63 mounted against the upper end of the front intermediary wall 41, while its lower end is secured to a rearwardly-extending lug 65 forming part of the rear carriage plate 47.

The front carriage plate 49 has mounted thereon a forwardly-extending bar 67 which extends outwardly through a vertical slot in the front wall of the outer casing 27 and has an actuating knob 69 mounted thereon by means of which an operator can move the carriers downwardly against the tension of the biasing spring 61 until the carriers are positioned in their lowermost or toasting position. The position shown in full lines in Fig. 3 of the drawings is the upper or non-toasting position. The two carriers 45 have their forwardly-extending front end portions secured to rearwardly-extending portions 71 constituting a part of the rear carriage plate 47 so that pressure upon actuating knob 69 will cause downward movement of the carriage plates 47 and 49 and of the grooved rollers 51, as well as of the bread carriers 45.

Means for holding the carriers in their lowermost toasting positions includes a hook 73 mounted on the lower end of a resilient bar 75, which is secured to the front carriage plate 49 at, say, the right-hand portion thereof adjacent the upper end. The resilient bar 75 normally engages a lug 77 constituting a part of the front carriage plate 49 adjacent the lower right-hand end portion thereof. When the bread carriers are moved downwardly, lug 73 is adapted to engage with the hook end 79 of a latch comprising a bell crank lever 81 pivotally mounted on a pin or stub shaft 83.

Energization of the toast heating elements 31 is controlled by a contact bridging member 85 insulatedly supported on front carriage plate 49. A pair of fixed contacts 87 and 89 are supported on a block 91 of electric-insulating material which is supported by a bracket 93 secured to the front intermediate wall 41 adjacent the lower end portion thereof. When the carriers are moved into their lowermost toasting positions, contact bridging member 85 will engage the two fixed contacts 87 and 89 to cause energization of the four electric toast heating elements.

I provide also a second pair of contact members 95 and 97, which are supported on a block 99 of an electric-insulating material which is supported by a bracket 101 secured to the front intermediate wall 41 adjacent to the upper end portion thereof and in position to be engaged by the contact bridging member 85 when the bread carriers are in their upper or non-toasting position. The purpose of these two additional contacts 95 and 97 will hereinafter appear.

While I have illustrated and described in Figs. 1 to 5 inclusive specific embodiments of a standard domestic type of automatic electric toaster, I do not desire to be limited thereto, since all of these elements are old and well known in the art and constitute no part of my present invention, which will now be described.

Referring now to Figs. 6 and 7, I have there illustrated the essential elements of a timer, which includes particularly an electron tube 103 which is adapted to be mounted on a suitable support comprising a sheet metal bracket 105 which is adapted to be secured against the bottom surface of plate 25. Other details comprised in the timer structure and circuit will be set forth and described by reference to Figs. 8 and 9.

Figure 8:
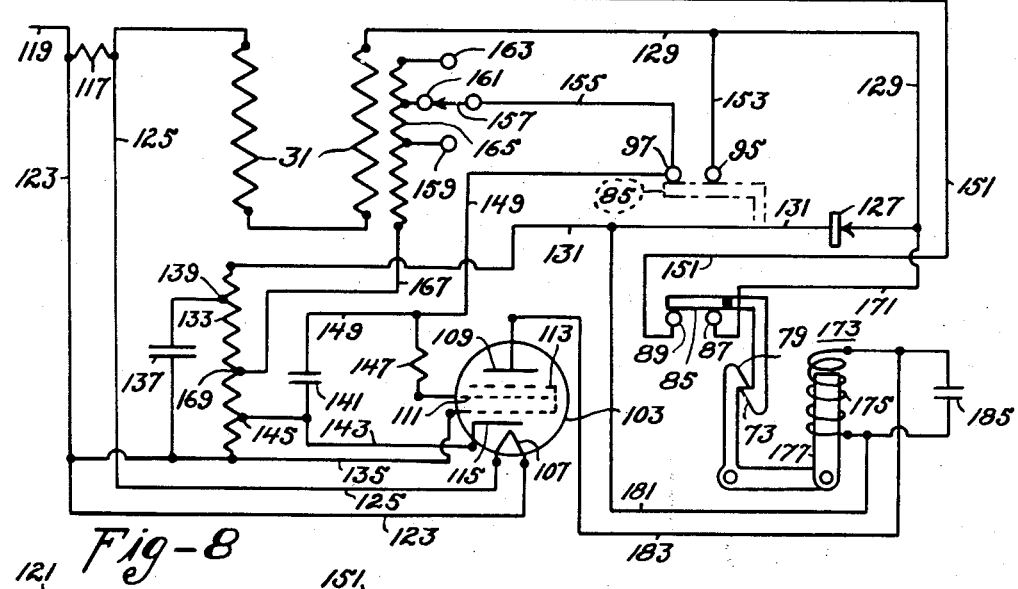
Fig. 8 is a diagram of an electric circuit comprising my invention.

Referring first of all to Fig. 8 of the drawings, the electron tube 103 is shown as a standard grid-controlled rectifier tube having four electrodes, a hot filament 107, a plate anode 109, a control grid 111, a screen grid 113, and an indirectly heated cathode 115. The particular electron tube employed in the circuit of Fig. 8 is of the positive grid-voltage type. The filament 107 is energized by a small resistor 117 connected in series electric circuit with the four toast heating elements 31, two of which are connected in series electric circuit with each other, and the pairs of series connected elements are connected in parallel with each other. A pair of supply circuit conductors 119 and 121 are provided and are to be energized by an alternating current source of supply, and the small filament energizing resistor 117 is connected between the toast heating elements 31 and the supply circuit conductor 119. The two ends of the filament 107 are connected by conductors 123 and 125 to the terminals of the small resistor 117, which is so selected as to provide a proper voltage to energize the filament 107.

A half-wave dry-type rectifier 127 is provided, and it may be of the copper-oxide type, although any of the similarly operative types of rectifier may be used. One terminal of rectifier 127 is connected to a conductor 129 which connects one terminal of one of the heaters 31 to contact 87 to impress substantially full A. C. line voltage on the rectifier 127 when said toaster heating elements are energized. The other terminal of rectifier 127 is connected by a conductor 131 to one terminal of a voltage divider 133, the other terminal of which is connected to a conductor 135 which is connected through conductor 123 to one supply circuit conductor 119. The other terminal of conductor 135 is connected to the screen grid 113. For illustrative purposes, it may be mentioned that the ohmic resistance of the voltage divider may be on the order of 3000 ohms. A filter or ballast condenser 137 is also provided, one terminal of which is connected to conductor 135, while the other terminal thereof is connected to a tap 139 on the voltage divider 133 adjacent to the upper end thereof.

I provide also a timing condenser 141, having a capacitance on the order of 10 microfarads, one terminal of which is connected to a conductor 143 which has one end thereof connected to the cathode 115, while the other end of conductor 143 is connected to a tap 145 on the voltage divider 133 near the lower end thereof. The other terminal of condenser 141 is connected to the control grid 111 through a resistor 147, the resistance of which may be on the order of 50,000 ohms. The other end of conductor 149 is connected to fixed contact 97 hereinbefore mentioned. Fixed contact 89 is connected by conductor 151 to the supply circuit conductor 121.

Fixed contact 95 is connected by a conductor 153 to conductor 129. Fixed contact 97 is connected by a conductor 155 to the fixed end of a manually-adjustable contact arm 157 which is adapted to engage fixed tap contacts 159, 161, and 163 of a timing resistor 165 which is positioned to be subject to heat from the toast heating elements 31 or is positioned in the toasting chamber proper. The resistance of resistor 165 is on the order of 10 megohms and has a negative temperature coefficient of resistance, that is, the resistance decreases with increase of temperature thereof.

The other terminal of resistor 165 is connected by a conductor 167 to a tap 169 on voltage divider 133. The other terminal 87 of the main switch is connected to the conductor 129 by a conductor 171. An electromagnetic latch release means 173 is also provided and includes a coil 175, an electromagnetic armature 177, the lower end of which is pivotally connected to the outer end of a horizontally-extending arm of the latch 81, so that upon energization of coil 175 by an electric current, armature 177 will be caused to move upwardly and to disengage hook end 79 from hood 73. One terminal of coil 175 is connected by a conductor 181 to conductor 131, while the other terminal of coil 175 is connected by a conductor 183 to plate anode 109 of tube 103. As in the diagram of connections of Fig. 8, the coil 175 will be traversed by rectified half waves of direct current, I may provide also a condenser 185 connected in shunt circuit with coil 175.

As hereinbefore stated, the tube 103 is of the positive grid-controlled type, that is, when the rated voltage is impressed between the anode 109 and the cathode 115 and no potential is impressed between cathode 115 and the control grid 111, the tube is normally non-conducting; but when a predetermined positive potential is applied between the cathode 115 and the grid 111, the tube is fired, or said in other words, becomes conductive. The critical firing potential of the grid 111 of such a tube depends on the magnitude of the potential applied to the screen grid 113; the more negative the screen grid bias voltage, the more positive must the control grid be before the tube fires or becomes conducting.

Let it now be assumed that the diagram of connections of a control circuit including an electron tube 103, such as shown in Fig. 8, is operatively associated with the toaster shown in Figs. 1 to 5 inclusive. After dropping one or two slices of bread through suitable openings in the cover of the toaster structure onto the bread carriers, the operator presses on knob 69 until the hook 73 engages the portion 79 of the electromagnetic latch hereinbefore described. This causes engagement of contact bridging member 85 with contacts 87 and 89, whereby energization of the toast heating elements 31 and of resistor 117 is effected. Energization of the voltage divider 133 is also effected, the voltage divider 133 being in series electric circuit with rectifier 127. One terminal of rectifier 127 is connected through conductor 171, through the closed main switch comprising contacts 87, 89 and contact bridging 85 and through conductor 151 to the second supply circuit conductor 121, while the other terminal of rectifier 127 is connected to the first supply circuit conductor 119 through conductor 131, voltage divider 133 and through conductors 135 and 123. The potential across the voltage divider 133 is thus approximately equal to the peak voltage of the A. C. supply circuit. The filter or ballast condenser 137 serves the purpose of smoothing out the rectified voltage waves and of absorbing random surges of the voltage supply in order to improve the reliability and accuracy of the timing performance. The small portion of the voltage divider 133 not shunted by the filter condenser 137 serves the purpose of limiting the charging current through the condenser 137 at the instant of closure of the toaster main switch.

The rectifier 127 is connected in the circuit in such a manner that the upper end of voltage divider 133 is of positive polarity, while the lower end at lead 145 is of negative polarity. The total resistance of the voltage divider 133 is in the neighborhood of 3000 ohms. The cathode 115 is connected to tap 145 of the voltage divider 133, while the screen grid 113 is connected to the lower end of the voltage divider by means of conductor 135. The screen grid is thus biased negatively relative to the cathode 115 by a voltage equal to the voltage drop between tap 145 and the lower end of the voltage divider 133. The resistance of this portion of the voltage divider is approximately 100 ohms to provide a negative grid bias in the neighborhood of 6 volts D. C. The full potential across the voltage divider 133 less the small voltage drop in the portion of the voltage divider below tap 145 is impressed between the anode 109 and the cathode 115 of the tube 103, the anode 109 being connected to the positive upper end of the voltage divider 133 through conductor 183 through the coil 175 and through leads 181 and 131, while the cathode is connected to the negative tap 145 of voltage divider 133 through conductor 143.

The charging potential for the timing condenser 141 is obtained between the taps 145 and 169 of the voltage divider, the polarity of the potential at tap 169 being positive relative to that at tap 145 and the resistance of the voltage divider between the two taps 145 and 169 being on the order of 300 ohms to provide a charging voltage on the order of 15 volts D. C. At the instant the voltage divider 133 is being energized the charging of the timing condenser 141 is initiated, and a small charging current begins to flow through conductor 167 to the timing resistor 165 and from the particular tap connected to the contact arm 157 through conductors 155 and 149 to one terminal of the timing condenser 141 and from the opposite terminal of the condenser 141 through a conductor to tap 145 on the voltage divider 133. The analysis of charging a condenser through a resistor is well known and need not be set forth in detail here. By a suitable selection of the energizing potential applied to the timing circuit and the ohmic resistance of the timing resistor 165, as well as the capacitance of the timing condenser 141, the length of time required to charge condenser 141 to a predetermined potential can very easily be calculated and for a toaster this length of time should be on the order of 2½ to 3 minutes when starting with a cold toaster.

When the potential at the terminals of timing condenser 141 has reached a value sufficiently high to cause firing of the tube 103, the tube will fire, that is, become conducting and a current will flow there through, the circuit of which is traceable substantially as follows: from supply circuit 121 through conductor 151 through closed main switch comprising contacts 89, 87 and bridging member 85, through conductor 171, through rectifier 127, through conductors 131 and 181, through coil 173, and through conductor 183 to plate 109, then through tube 103 to cathode 115, and through lead 143, through the lower portion of voltage divider 133, and then through conductors 135 and 123 to the fixed supply circuit conductor 119. It is therefore evident that coil 175 is traversed by rectified half waves of direct current voltage, and it is also evident that the condenser 185 is required to maintain a magnetic pull during the half cycles when the rectifier is non-conducting. This current traversing the tube 103 and coil 175 causes upward movement of armature 177 and release by latch member 79 of hook member 73, permitting spring 61 to cause quick upward movement of the bread carriers into non-toasting position and attendant opening of the main switch controlling the energization of heaters 31. The use of resistor 147, which has an ohmic resistance on the order of 50,000 ohms, serves the purpose of limiting the discharge current from the timing condenser 141 through tube 103.

At the termination of each cycle of operation of the circuit shown in Fig. 8, it is advisable to restore the electrical timing circuit to its initial non-charged conditions and the two upper fixed contact members 95 and 97 in combination with contact bridging member 85 and the toast heating elements 31, serve for this purpose. When contact bridging member 85 is moved into its upper position and into engagement with contacts 95 and 97, a discharge circuit for the timing condenser 141 is provided traceable as follows: from the lower terminal of condenser 141 to the tap 145, and then through the lower part of the voltage divider 133, through conductors 135 and 123, through resistor 117 and heating elements 31, through conductors 129 and 153, through contacts 95 and 97, and the engaged contact bridging member 85, and through conductor 149 to the other terminal of timing condenser 141. This provides means for fully discharging the timing condenser 141 so that upon starting a quickly succeeding toasting operation, there will be no charge remaining in condenser 141.

Let it now be assumed that adjustable contact arm 157 of the timing resistor 165 was set so as to engage the contact connected with tap 161 and that, starting with a cold toaster, the adjustment of the various component parts of the circuit was such that medium toast was obtained. It has already been hereinbefore set forth that the resistor 165 has a negative temperature coefficient of resistance, that is, its resistance will decrease with increase of temperature. This decrease of resistance of that part of the timing resistor 165 electrically connected in the circuit is such that upon start of a second quickly succeeding toasting operation the length of time required to charge the timing condenser 141 to the firing potential has been reduced to such a value that substantially the same degree of toasting will be obtained when a toaster has been heated to a somewhat higher temperature as was obtained with a cold toaster during the first operation. By proper coordination of the degree of temperature rise of the toaster and of the decrease of resistance of the timing resistor 165, it is possible to obtain substantially the same degree of toasting, irrespective of the temperature of the toaster structure.

Let it now be assumed that a second user would like to obtain say light toast instead of medium toast. It is only necessary to manually turn an adjustment knob 187 mounted at the front end of the toaster structure so as to move contact arm 157 into engagement with tap 159, thereby removing some of the resistance from the charging circuit. This will mean that the timing condenser 141 will be charged to a potential sufficient to fire the electron tube 103 in a shorter time than was necessary as compared to the time for the first operation when medium toast was called for. If, on the other hand, dark toast is desired, the contact arm 157 will be moved into engagement with the contact connected to tap 163, so that more ohmic resistance is introduced in series with the timing condenser 141, with the result that it will require a somewhat longer time to fully charge the condenser to the tube firing potential which will therefore cause dark toast to result instead of medium toast.

The circuit shown in Fig. 8 is effective also to compensate for higher supply circuit voltages or for lower supply circuit voltages since when the toast heating elements 31 are subjected to a much higher than normal voltage, they will operate at a higher temperature, which will cause a greater decrease in the resistance of the timing resistor 165 than would be the case if subject only to normal voltage. The slice or slices of bread subject to the higher temperature radiating heat from the toast heating elements 31 will be subjected thereto for a shorter period of time, which period of time is sufficient to provide substantially the same degree of toasting.

Figure 9:
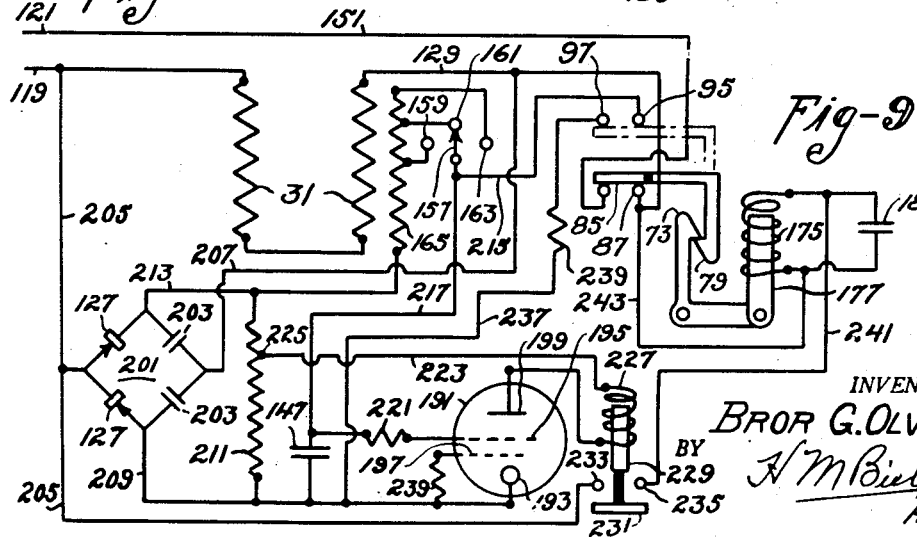
Fig. 9 is a different diagram of connections embodying my invention.

Referring now to Fig. 9 of the drawings, I have there shown a different circuit which I may use. I provide an electron tube 191 which is of the cold cathode grid-controlled rectifier type or may be described as a positive grid biased type of tube having a cold cathode 193, a grid 195, a screen grid 197, and a plate anode 199.

I provide also a voltage doubler bridge 201 comprising two half-wave dry-type rectifiers 127, and two condensers 203 connected in a bridge circuit and adapted to be energized from the supply circuit conductor 119, through a conductor 205, and from conductor 129, through a conductor 207 connected respectively to the two opposite terminals of the bridge. The other two terminals of the bridge are connected respectively by a conductor 209 to one terminal of a voltage divider 211, which may be a resistance on the order of 2000 ohms, while the other terminal of the bridge is connected by a conductor 213 to the other terminal of the voltage divider 211. The last mentioned terminal of the voltage divider is connected by conductor 213 to one terminal of a timing resistor 165, which is provided with three taps 159, 161, and 163. The timing resistor 165 is subject to either the toasting chamber temperature or to heat from the toast heating elements 31 and is also made of a material having a negative temperature coefficient of resistance. An adjustable contact arm 157 is adapted to be moved selectively into engagement with the taps 159, 161, and 163; and this contact arm is connected by a conductor 215 to fixed contact 95 and is also connected by a conductor 217 to one terminal of a timing condenser 141, the other terminal of which is connected to conductor 209, which connects the voltage doubler bridge to the cold cathode 193 and to one terminal of a small resistor 219 which is connected to screen grid 197. Conductor 217 and particularly the timing condenser 141 is connected to grid 195 through a resistor 221, the ohmic value of the resistance of which is on the order of 5 megohms and serves the purpose of limiting the condenser discharge current through the grid circuit of the tube. A conductor 223 has one end thereof connected to a tap 225 on voltage divider 211 and has its other end connected to a coil 227 which energizes an armature 229 of a small relay which comprises a contact bridge member 231 secured to armature 229 and is adapted to engage with and be disengaged from a pair of fixed contacts 233 and 235. The other terminal of relay coil 227 is connected to the anode 199 of tube 191. Conductor 209 is connected to the screen grid 197 through a resistance 219, the ohmic value of which may be on the order of 10 megohms. Conductor 209 is also connected by a conductor 237 to one terminal of a discharge resistor 239, the other terminal of which is connected to contact 97. The ohmic value of the resistance of resistor 239 may be on the order of 50 ohms.

The contact bridging member 231 and the fixed contacts 233 and 235 control the circuit of a coil 175 of an electromagnetic latch release means comprising an armature core 177, as has already been hereinbefore set forth. One terminal of coil 175 is connected by a conductor 241 with fixed contact 235, while the other terminal of coil 175 is connected to contact 87 by a conductor 243.

The operation of the circuit shown in Fig. 9 is substantially as follows: upon depression of knob 69 of the toaster preparatory to starting a toasting operation, the heating elements 31 are energized as is also the voltage doubler bridge 201, which will then be connected to the supply circuit conductors 119 and 121 and will provide a rectified direct current potential on the order of 300 volts between the conductors 209 and 213, of appropriate polarity, which is applied to the voltage divider 211 so that the upper end of the voltage divider is positive. The voltage provided between the conductors 209 and 213 is applied to the timing condenser 141 through the timing resistor 165. The resistance of the timing resistor 165 connected in circuit with the timing condenser may be reduced through the taps, any one of which may be engaged by manually-adjustable contact arm 157. The timing condenser 141 will therefore be charged in substantially the same manner as is a direct current storage battery until the potential across the terminals thereof has been increased to a value which will fire tube 191 and cause the same to become conducting, the current traversing the tube and the coil 227 connected in series circuit therewith being provided by the voltage doubler bridge.

The energized relay comprising particularly coil 227 will move the contact bridging member 231 upwardly to cause an energizing circuit through coil 175 traceable as follows: from supply circuit conductor 119, through conductor 205, through engaged contacts 233 and 235 with bridging member 231, through conductor 241, coil 175, through conductor 243, through contact bridging member 85, and through conductor 151 to the other supply circuit conductor 121. A small condenser 185 having a capacitance on the order of .1 microfarad may be shunted across the coil 175 to reduce chatter.

The design and adjustment of the various parts comprising the voltage doubler bridge, the voltage divider, the timing resistor, as well as the timing condenser are so selected that when starting with a cold timing resistor 165, the time required to increase the voltage across the terminals of the timing condenser to a value which will fire tube 191 will be on the order of 2½ or 3 minutes, which will permit of proper toasting of a slice of bread when done in a cold toaster. As has already been hereinbefore stated, the timing resistor 165 is either subject to heat from the toast heating elements 31 or is positioned in the toasting chamber, so that having a negative temperature coefficient of resistance, its resistance will decrease with increase of temperature and upon quickly following toasting operations, the resistance of timing resistor 165 will be less, whereby the time required to cause charging of the timing condenser 141 to a potential which will fire tube 191 is reduced so that substantially the same degree of toasting of the second and third slices of bread will be effected, the same comments holding for other successive slices of bread toasted in the toaster.

To predetermine the degree of toasting, such as dark, medium, or light toast, contact arm 157 may be moved into engagement with the contact connected to tap 163 to obtain dark toast, moved into engagement with tap 161 to obtain medium toast and moved into engagement with tap 159 to obtain light toast. The timing resistor 165 being subject to chamber temperature or to heat from the toast heating elements and having a negative temperature coefficient of resistance therefore permits of obtaining similar degrees of toasting of successive slices of bread, irrespective of temperature changes in the toaster structure, while the taps thereon permit of obtaining the desired degree of toasting ranging from light into medium and to dark.

The two upper fixed contacts 95 and 97 cooperate with the contact bridging member 85 when the bread carriers have been moved to their upper non-toasting positions to cause discharge of the timing condenser 141 through a circuit traceable as follows: from the upper terminal of condenser 141 through conductors 217 and 215, to contact 95, through bridging member 85, to contact 97, and from there through the discharge resistor 239, through conductor 237, and through conductor 209 to the other terminal of condenser 141.

As in Fig. 8 of the drawings, the condenser 141 was discharged through the toast heating elements, the diagram shown in Fig. 9 causes discharge of the condenser 141 through a separate discharge resistor 239.

Substantially the same comments as hereinbefore made in connection with the diagram of Fig. 8 apply also to the diagram of Fig. 9, and it is therefore considered unnecessary to repeat them for Fig. 9.

It is therefore evident that I provide a timing resistor which has a negative temperature coefficient of resistance and is subject to either heat from the toast heating elements or is positioned in the toasting chamber to insure that substantially the same degree of toasting will be effected, irrespective of temperature changes of the toaster or variation of the supply circuit voltage, while the provision of taps therein permits of obtaining the desired degree of toasting, irrespective of variations in the temperature of the toaster structure.

Various modifications may be made in the device embodying my invention without departing from the spirit and scope thereof, and all such modifications clearly coming within the scope of the appended claims are to be considered as being covered thereby.

I claim as my invention:

1. In an automatic electric toaster the combination with a toasting chamber, electric toast heating means, a control switch for said heating means biased to open position and including a contact bridging member, means to move said bridging member into circuit closing position to start a toasting operation and a latch for holding said bridging member in circuit closing position, of means for terminating a toasting operation comprising a normally non-conducting electron tube, at least one rectifier, an electrostatic timing condenser connected to said tube, a timing resistor connected between said rectifier and said timing condenser for charging said condenser to a potential at which the tube becomes conducting, said timing resistor having a negative temperature coefficient of resistance and being subject to toaster chamber temperatures to vary the duration of a toasting operation in accordance with toaster temperature, and being manually-adjustable to preset the degree of toasting of a slice of bread during a toasting operation, means energized by the current traversing said tube for causing release of said latch and termination of a toasting operation and means controlled by said contact bridging member for discharging said condenser upon termination of a toasting operation.

2. In an automatic electric toaster the combination with electric toast heating means, a control switch for said heating means biased to open position and including a contact bridging member, a bread carrier movable into toasting and non-toasting positions relatively to said heating means and biased to non-toasting position, means to move said carrier into toasting position and said switch into closed position and latch means for holding said switch in closed position and said carrier in toasting position, of means for terminating a toasting operation comprising a normally non-conducting electron tube, a timing condenser connected with said tube, a timing resistor, at least one rectifier connected to charge the condenser through the resistor to a potential at which said tube becomes conducting, said timing resistor having negative temperature coefficient of resistance and being subject to heat from the heating means to vary the duration of a toasting operation in accordance with toaster temperature, and being manually adjustable to preset the degree of toasting of a slice of bread during a toasting operation, means energized by the current traversing the tube for causing release of said latch and means including said contact bridging member for discharging said condenser upon termination of a toasting operation.

3. In an automatic electric toaster the combination with a toasting chamber, electric toast heating means, a control switch for said heating means biased to open position and including a contact bridging member means to move said bridging member into circuit closing position to start a toasting operation and a latch for holding said bridging member in circuit closing position, of means for terminating a toasting operation comprising a normally non-conducting electron tube, at least one rectifier, an electrostatic timing condenser connected to said tube, a timing resistor connected between said rectifier and said timing condenser for charging said condenser to a potential at which the tube becomes conducting, said timing resistor having a negative temperature coefficient of resistance and being subject to toaster chamber temperature to vary the duration of a toasting operation in accordance with toaster temperature, and being manually adjustable to preset the degree of toasting of a slice of bread during a toasting operation, means energized by the current traversing said tube for causing release of said latch and termination of a toasting operation and means controlled by said contact bridging member, and including the toast heating means for discharging said condenser upon termination of a toasting operation.

4. In an automatic electric toaster the combination with a toasting chamber, electric toast heating means, a control switch for said heating means biased to open position and including a contact bridging member, means to move said bridging member into circuit closing position to start a toasting operation and a latch for holding said bridging member in circuit closing position, of means for terminating a toasting operation comprising a normally non-conducting electron tube, at least one rectifier, an electrostatic timing condenser connected to said tube, a timing resistor connected between said rectifier and said timing condenser for charging said condenser to a potential at which the tube becomes conducting, said timing resistor having a negative temperature coefficient of resistance and being subject to toaster chamber temperature to vary the duration of a toasting operation in accordance with toaster temperature, and being manually adjustable to preset the degree of toasting of a slice of bread during a toasting operation, means energized by the current traversing said tube for causing release of said latch and termination of a toasting operation and means controlled by said contact bridging member, and including a resistor for discharging said condenser upon termination of a toasting operation.

BROR G. OLVING.

REFERENCES CITED

The following references are of record in the file of this patent:

UNITED STATES PATENTS

| Number | Name | Date |
| --- | --- | --- |
| 1,985,051 | Minkler | Dec. 18, 1934 |
| 2,024,019 | Wright | Dec. 10, 1935 |
| 2,061,011 | Vingerhoets | Nov. 17, 1936 |
| 2,099,210 | Ireland | Nov. 16, 1937 |
| 2,182,124 | Guerra | Dec. 5, 1939 |
| 2,207,871 | Myers | July 16, 1940 |
| 2,215,404 | Myers | Sept. 17, 1940 |
| 2,317,228 | Shroyer | Apr. 20, 1943 |
| 2,364,998 | Palmer et al. | Dec. 12, 1944 |
| 2,361,446 | Anderson | Oct. 31, 1944 |
| 2,415,963 | Olving | Feb. 18, 1947 |